(12) United States Patent
Moles et al.

(10) Patent No.: US 6,522,873 B1
(45) Date of Patent: Feb. 18, 2003

(54) SYSTEM AND METHOD FOR CHANGING A WIRELESS MOBILE STATION BETWEEN SLOTTED MODE OPERATION AND NON-SLOTTED MODE OPERATION

(75) Inventors: Bryan J. Moles, Dallas County, TX (US); Orlando Marrufo, Dallas County, TX (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/475,603

(22) Filed: Dec. 30, 1999

(51) Int. Cl.[7] .................................................. H04B 1/16
(52) U.S. Cl. ...................... 455/343; 455/572; 455/573; 455/574; 455/436; 370/311; 370/335; 370/331
(58) Field of Search .................................. 455/343, 439, 455/436, 437, 442, 443, 572, 573, 574; 370/311, 335, 331

(56) References Cited

U.S. PATENT DOCUMENTS

| | | | | |
|---|---|---|---|---|
| 4,794,649 A | * | 12/1988 | Fujiwara | |
| 5,806,007 A | * | 9/1998 | Raith et al. | 455/574 |
| 5,870,685 A | * | 2/1999 | Flynn | 455/573 |
| 5,883,888 A | * | 3/1999 | St-Pierre | 370/331 |
| 5,884,196 A | * | 3/1999 | Lekven et al. | 455/574 |
| 5,950,120 A | * | 9/1999 | Gardner et al. | 455/343 |
| 6,021,122 A | * | 2/2000 | Tiedemanne, Jr. | 370/331 |
| 6,041,241 A | * | 3/2000 | Willey | 455/574 |
| 6,138,034 A | * | 10/2000 | Willey | 455/522 |
| 6,154,663 A | * | 11/2000 | Itamochi | 455/569 |
| 6,192,230 B1 | * | 2/2001 | Bokhorst et al. | 455/343 |

* cited by examiner

*Primary Examiner*—Edward F. Urban
*Assistant Examiner*—Marceau Milord

(57) ABSTRACT

There is disclosed, for use in a wireless communication device capable of communicating with a base station of a wireless network in a slotted mode of operation and in a non-slotted mode of operation, an apparatus capable of controlling the slotted mode of operation and the non-slotted mode of operation. The apparatus comprises: 1) a power monitor for determining if an external power supply is providing external power to the wireless communication device and generating a first signal indicating whether external power is being provided; and 2) a slotted mode power controller coupled to the power monitor and for receiving the first signal. The slotted mode power controller terminates the slotted mode of operation whenever the first signal indicates that the external power is being provided.

21 Claims, 3 Drawing Sheets

SYSTEM AND METHOD FOR CHANGING A WIRELESS MOBILE STATION BETWEEN SLOTTED MODE OPERATION AND NON-SLOTTED MODE OPERATION

TECHNICAL FIELD OF THE INVENTION

The present invention is directed, in general, to wireless networks and, more specifically, to a system for controlling power consumption in an wireless mobile station by changing between slotted mode operation and non-slotted mode operation.

BACKGROUND OF THE INVENTION

Reliable predictions indicate that there will be over 300 million cellular telephone customers worldwide by the year 2000. Within the United States, cellular service is offered by cellular service providers, by the regional Bell companies, and by the national long distance operators. The enhanced competition has driven the price of cellular service down to the point where it is affordable to a large segment of the population. In addition to cellular telephones, consumers use a wide variety of other wireless communication devices that communicate with base stations that are part of a wireless network.

Mobile stations, such as cellular telephones, PCS handset devices, portable computers, telemetry devices, and the like, frequently operate from an external power source connected to the mobile station, with an internal battery supply being available to provide a limited period of operation without the external power source. Mobile stations which provide more extended intervals of battery back-up operation offer increased value of service to users and competitive advantages for service providers.

Typically, mobile station battery operation is extended through the use of techniques which lower the amount of required power when the mobile station is in an idle state and not transferring voice or data traffic. A mobile station may enable one or more power saving configurations when it is in the idle state. For instance, the mobile station may disable its transmitter during the idle state, decreasing the amount of power required for idle state operation. A mobile station may further reduce its idle state power requirements by enabling a slotted mode of operation with a base station.

A mobile station enters the idle state when the mobile station is turned ON, is synchronized with the system, and has no calls in progress. During the idle state, a mobile station actively listens to a paging channel for information which includes overhead messages, such as system parameter messages, as well as messages directly addressed to the mobile station from a base station. A mobile station may be operating on battery or an external power source when it is in the idle state.

During the idle state, the mobile station may communicate with a base station in a non-slotted or slotted mode. A typical paging channel slot is an 80 millisecond time slot within a paging slot cycle, with a slot cycle ranging from 16 to 2048 time slots. In the non-slotted mode, the mobile station monitors all paging channel slots for messages from the base station. In the slotted mode, the mobile station only monitors a selected subset of the paging channel slots for messages from the base station. The remainder of the time, power is turned OFF to the receiver circuits in the mobile station in order to save power. A mobile station extends the battery supply operating life by entering a slotted mode of operation with the base station because the mobile station receiver consumes power only during selected slot cycles rather than across the entire paging cycle.

Unfortunately, slotted mode of operation decreases the rate at which messages can be received by the mobile station. Each message may be divided across multiple time slots during slotted mode of operation. This can be detrimental when the mobile station is moving rapidly from the coverage area of a first base station to the coverage area of a second base station, because a handoff message may not properly be received before the mobile station has moved too far away from the first base station. As a result, a communication link may be dropped and the mobile station must reacquire another base station. A user is typically unaware of slotted mode of operation, because the mobile station is frequently configured to enter slotted mode automatically in order to prolong battery life. This is true even when the mobile station is connected to an external power supply.

Therefore, there exists a need for improved wireless devices that are less susceptible to losing a communication to a base station due to prolonged slotted mode. In particular, there is a need in the art for improved wireless devices capable of automatically terminating slotted mode operation when it is not needed.

SUMMARY OF THE INVENTION

To address the above-discussed deficiencies of the prior art, it is a primary object of the present invention to provide, for use in a wireless communication device capable of communicating with a base station of a wireless network in a slotted mode of operation and in a non-slotted mode of operation, an apparatus capable of controlling the slotted mode of operation and the non-slotted mode of operation. In an advantageous embodiment of the present invention, the apparatus comprises: 1) a power monitor capable of determining if an external power supply is providing external power to the wireless communication device and generating a first signal indicating whether external power is being provided; and 2) a slotted mode power controller coupled to the power monitor and capable of receiving the first signal, wherein the slotted mode power controller is capable of terminating the slotted mode of operation whenever the first signal indicates that the external power is being provided.

According to one embodiment of the present invention, the slotted mode power controller terminates the slotted mode of operation by communicating with the base station to establish a non-slotted mode of operation.

According to another embodiment of the present invention, the power monitor monitors an external power supply interface circuit capable of receiving the external power.

According to still another embodiment of the present invention, the power monitor modifies a value of the first signal according to whether the external power supply is receiving the external power.

According to yet another embodiment of the present invention, the slotted mode power controller is capable of re-establishing the slotted mode of operation whenever the first signal indicates that the external power is not being provided.

According to a further embodiment of the present invention, the external power supply interface is used to charge an internal battery power supply in the wireless communication device.

According to a still further embodiment of the present invention, the power monitor is capable of measuring a power level provided by the external power supply.

According to a yet further embodiment of the present invention, the power monitor is capable of determining if the measured power level is below a minimum threshold power level, and in response to a determination that the measured power level is below the minimum threshold power level modifying the first signal to indicate that the external power is not being provided.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

Figure 1:
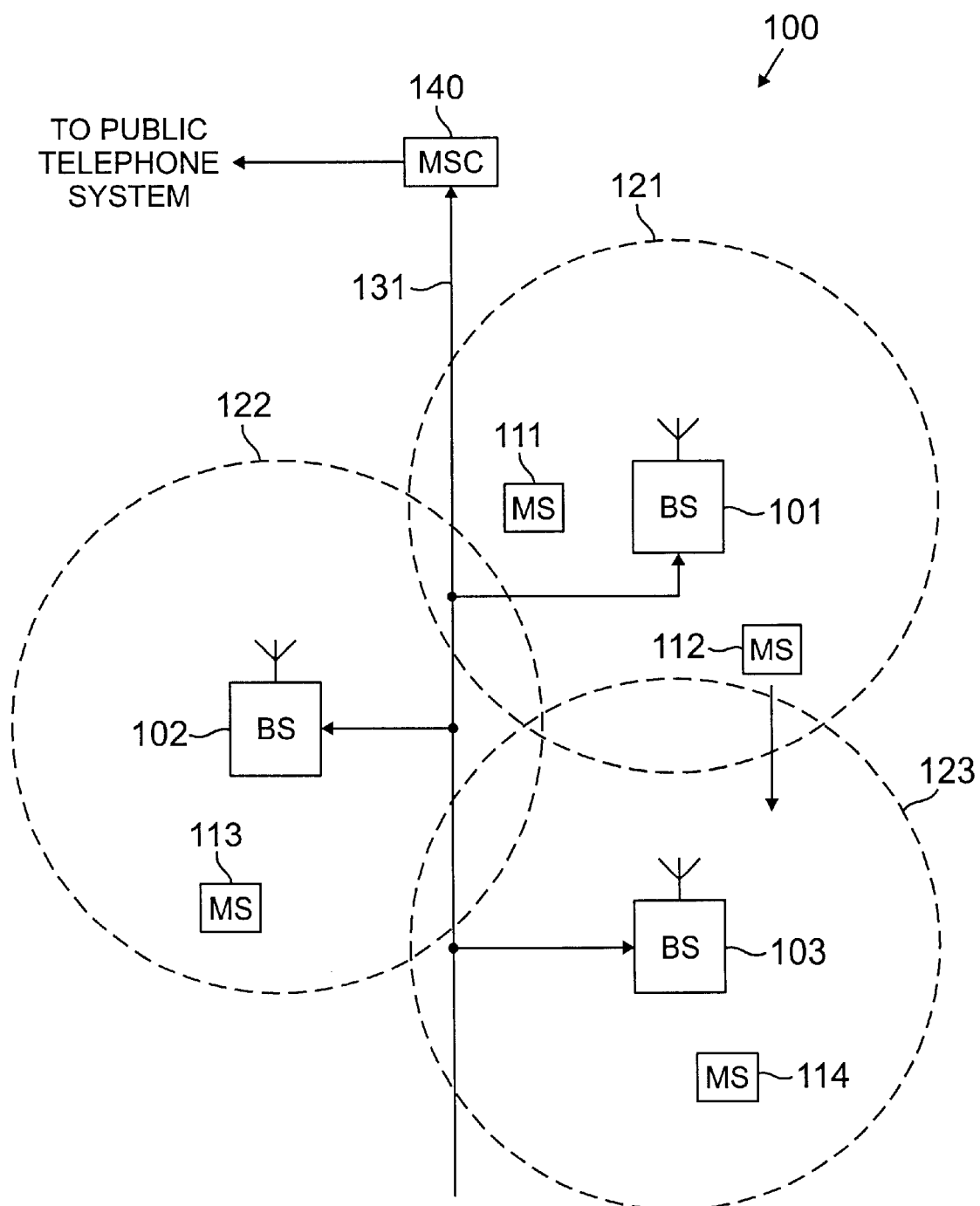
FIG. 1 illustrates an exemplary wireless network according to one embodiment of the present invention.
Figure 2:
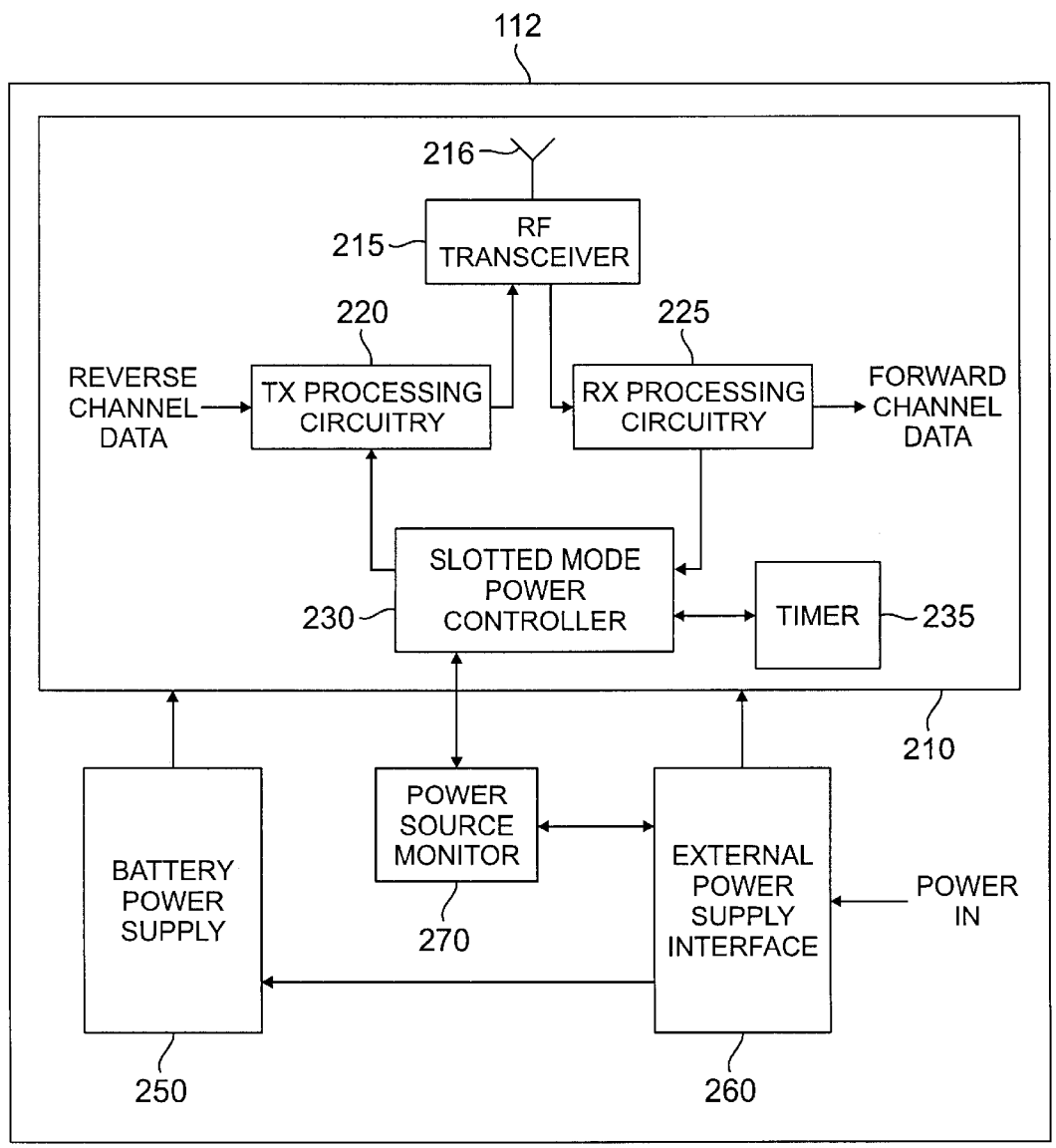
FIG. 2 illustrates an exemplary mobile station in greater detail according to one embodiment of the present invention.
Figure 3:
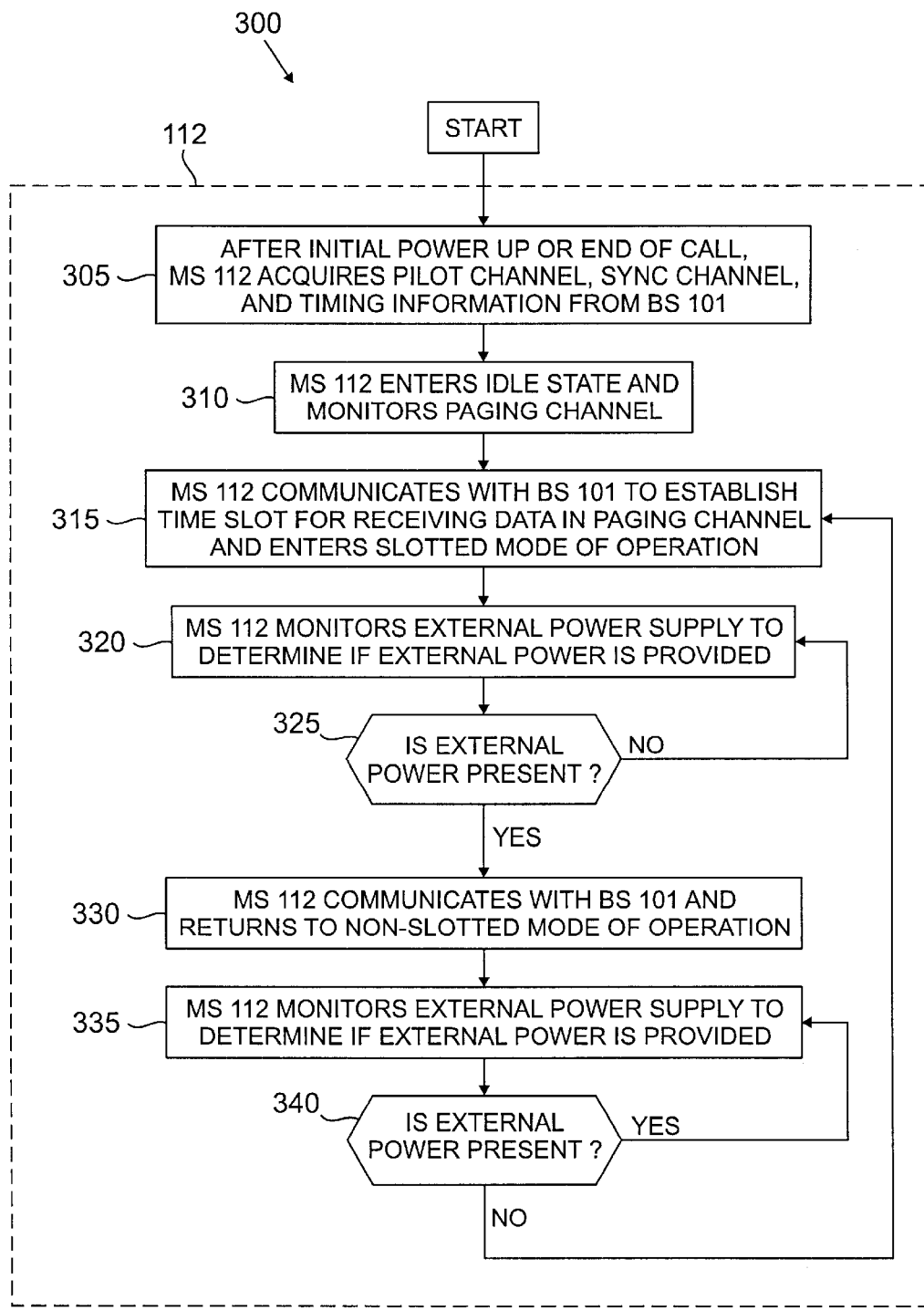
FIG. 3 is a flow diagram illustrating the operation of an exemplary mobile station according to one embodiment of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable wireless communication devices, including conventional cellular telephones, PCS handset devices, portable computers, telemetry devices, and the like.

Dotted lines show the approximate boundaries of the cell sites 121–123 in which base stations 101–103 are located. The cell sites are shown approximately circular for the purposes of illustration and explanation only. It should be clearly understood that the cell sites also may have irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system and/or the Internet. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

One or more of the mobile stations in FIG. 1 may be configured by the user, or at the factory, to automatically enter slotted mode operation. As previously described, a mobile station enters the idle state when the mobile station is turned ON, is synchronized with the system, and is not in the call processing mode. During the idle state, the mobile station may be communicate with a base station in the non-slotted mode or slotted mode on the paging channel and may be operating on battery or an external power source. A mobile station enters slotted mode of operation by exchanging a series of messages with a base station according to the standard protocol for wireless network 100. For example, BS 101 may send a maximum-slot-cycle-index parameter and a paging-slot-number in the paging channel system parameters overhead message for BS 101. Using this information and internal parameters, MS 112 independently calculates, for example, one or two paging channel (active) time slots in a 16-time slot paging cycle during which MS 112 may monitor overhead messages from BS 101.

During most of the slotted mode cycle (inactive) state, the power requirements for MS 112 are minimized since only minimal communications are occurring with the base station and power can be reduced, for example, in the transmitter and receiver. MS 112 only need to enable circuits associated with timing and controlling the slot cycle and slot intervals. In this power-saving configuration, MS 112 may only enable the receiver and other functions during the active-state, as necessary for receiving and updating required system parameter information from BS 101.

As noted above, however, slotted mode operation decreases the rate at which messages can be received by the mobile station because messages may be divided across multiple time slots during slotted mode operation. This may cause a communication link to be dropped if the mobile station is moving rapidly from the coverage area of a first base station to the coverage area of a second base station, because a handoff message may not be received before the mobile station has moved too far away from the first base station. The present invention minimizes the risk of losing a communication link by automatically terminating slotted mode operation when it is not necessary to minimize power consumption in the mobile station.

FIG. 2 illustrates exemplary mobile station (MS) 112 in greater detail according to one embodiment of the present invention. MS 112 comprises transceiver circuit assembly 210, battery power supply 250, external power supply interface 260, and power source monitor 270. Transceiver circuit assembly 210 further comprises RF transceiver 215, antenna array 216, transmitter (TX) processing circuitry 220, receiver processing circuitry 225, slotted mode power controller 230, and timer 235.

RF transceiver 215 sends and receives the forward channel and reverse channel RF signals from antenna array 216 and converts them to and from digital signals. Antennal array 216 transfers forward and reverse channel information between network 100 and RF transceiver 215. Transmitter (TX) processing circuitry 220 receives reverse channel data from other parts of MS 112, such as voice data from a speaker or fax data, modem data, or Internet protocol (IP) data if MS 112 is a personal computer, fax machine or the like. Receiver (RX) processing circuitry 225 processes forward channel data such as incoming voice data, fax data, modem data, IP data, control channel data, and paging channel information. RX processing circuitry 225 transfers this processed forward channel data to other portions of MS 112 or to other devices, such as a video display.

Slotted mode power controller 230 uses information from BS 101 to establish a time slot(s) for receiving paging messages and parametric data, as previously described. Slotted mode power controller 230 also communicates with timer 235 for control of synchronization and identification of enabled time slots for communicating with a base station. Timer 235 provides basic timing for MS 112, including identification of time slot(s) for MS 112 slotted mode power levels and transactions.

Battery power supply 250 provides an internal power source for MS 112 and the components on transceiver circuit assembly 210. Battery power supply 250 is coupled to, and is charged through, external power supply interface 260. When power is not available from an external source coupled to external power supply interface 260, battery power supply 250 provides power for the operation of MS 112.

Power source monitor 270 determines if external power is available by monitoring external power supply interface 260. When external power is absent from external power supply interface 260, power source monitor 270 generates a Slotted Mode Enable signal that is sent to slotted mode power controller 230, which may then enter slotted mode operation when MS 112 is in the idle state. Power source monitor 270 disables the Slotted Mode Enable signal when the external power supply is present.

FIG. 3 depicts flow diagram 300, which illustrates the operation of exemplary mobile station 112 according to one embodiment of the present invention. After initial power up or at the conclusion of a call, MS 112 acquires the pilot channel, synchronization (sync) channel, and required timing information from BS 101 (process step 305). MS 112 then enters the idle state and monitors the paging channel for updates to system parameters and incoming call information (process step 310). MS 112 communicates with BS 101 to establish one or more time slots in which BS 101 may receive data, such as system parameter information, during slotted mode operation. MS 112 uses the time slot information to synchronize timer 235 (process step 315).

MS 112 monitors external power supply interface 260 to determine if external power is provided (process step 320). If external power is absent, MS 112 continues to monitor the external power source and remains in the slotted mode of operation (process steps 325 and 320). If external power is present, MS 112 communicates with BS 101 and returns to the non-slotted mode of operation (process steps 325 and 330). Thereafter, MS 112 remains in the non-slotted mode of operation and monitors external power supply interface 260 to determine if external power is present. If an external power supply is providing power, MS 112 continues to monitor the external power supply and remains in the non-slotted mode of operation (process step 340 and 335). If MS 112 subsequently determines that the external power supply has been removed and no longer provides power, MS 112 returns to the slotted mode of operation (process step 340 and 315). It should be noted that MS 112 continues to go to non-slotted mode whenever MS 112 is required to send messages to BS 101 on the access channel.

In an advantageous embodiment of the present invention, power source monitor 270 is capable of measuring level of the input power provided by the external power supply coupled to external power supply interface 260. Power source monitor 270 comprises comparator circuitry capable of comparing the measured power level to a predetermined minimum threshold power level. If power source monitor 270 determines that the measured power level is below the minimum threshold power level, power source monitor 270 sets the Slotted Mode Enable signal to indicate that external power is not being provided. In this manner, if external power is present, but the power level of the external power supply is so low that MS 112 must rely on battery power, MS 112 will remain in slotted mode operation and continue to minimize power consumption.

The present invention automatically moves MS 112 back and forth between slotted mode operation and non-slotted mode operation without intervention by the user. Whenever external power is present and it is no longer necessary to reduce power in order to preserve battery life, the present invention automatically terminates slotted mode operation, thereby increasing the rate at which messages from BS 101 may be received in the idle state and reducing the probability that a communication link may be lost.

Although the present invention has been described in detail, those skilled in the art should understand that they can make various changes, substitutions and alterations herein without departing from the spirit and scope of the invention in its broadest form.

What is claimed is:

1. For use in a wireless communication device capable of communicating with a base station of a wireless network in a slotted mode of operation and in a non-slotted mode of operation, an apparatus capable of controlling said slotted mode of operation and said non-slotted mode of operation comprising:
   a power monitor capable of determining if an external power supply is providing external power to said wireless communication device and generating a first signal indicating whether external power is being provided; and
   a slotted mode power controller coupled to said power monitor and capable of receiving said first signal, wherein said slotted mode power controller is capable of terminating said slotted mode of operation whenever said first signal indicates that said external power is being provided to said wireless communication device.

2. The apparatus set forth in claim 1 wherein said slotted mode power controller terminates said slotted mode of operation by communicating with said base station to establish a non-slotted mode of operation.

3. The apparatus set forth in claim 1 wherein said power monitor monitors an external power supply interface circuit capable of receiving said external power.

4. The apparatus set forth in claim 3 wherein said power monitor modifies a value of said first signal according to whether said external power supply is receiving said external power.

5. The apparatus set forth in claim 4 wherein said slotted mode power controller is capable of re-establishing said slotted mode of operation whenever said first signal indicates that said external power is not being provided.

6. The apparatus set forth in claim 5 wherein said external power supply interface is used to charge an internal battery power supply in said wireless communication device.

7. The apparatus set forth in claim 1 wherein said power monitor is capable of measuring a power level provided by said external power supply.

8. The apparatus set forth in claim 7 wherein said power monitor is capable of determining if said measured power level is below a minimum threshold power level and, in response to a determination that said measured power level is below said minimum threshold power level, modifying said first signal to indicate that said external power is not being provided.

9. A wireless communication device comprising:
   transceiver circuitry capable of communicating with a base station of a wireless network in a slotted mode of operation and in a non-slotted mode of operation; and
   an apparatus coupled to said transceiver circuitry capable of controlling said slotted mode of operation and said non-slotted mode of operation comprising:
   a power monitor capable of determining if an external power supply is providing external power to said wireless communication device and generating a first signal indicating whether external power is being provided; and
   a slotted mode power controller coupled to said power monitor and capable of receiving said first signal, wherein said slotted mode power controller is capable of terminating said slotted mode of operation whenever said first signal indicates that said external power is being provided to said wireless communication device.

10. The wireless communication device as set forth in claim 9 wherein said slotted mode power controller terminates said slotted mode of operation by communicating with said base station to establish a non-slotted mode of operation.

11. The wireless communication device as set forth in claim 9 wherein said power monitor monitors an external power supply interface circuit capable of receiving said external power.

12. The wireless communication device as set forth in claim 11 wherein said power monitor modifies a value of said first signal according to whether said external power supply is receiving said external power.

13. The wireless communication device as set forth in claim 12 wherein said slotted mode power controller is capable of re-establishing said slotted mode of operation whenever said first signal indicates that said external power is not being provided.

14. The wireless communication device as set forth in claim 13 wherein said external power supply interface is used to charge an internal battery power supply in said wireless communication device.

15. The wireless communication device as set forth in claim 9 wherein said power monitor is capable of measuring a power level provided by said external power supply.

16. The wireless communication device as set forth in claim 15 wherein said power monitor is capable of determining if said measured power level is below a minimum threshold power level and, in response to a determination that said measured power level is below said minimum threshold power level, modifying said first signal to indicate that said external power is not being provided.

17. For use in a wireless communication device capable of communicating with a base station of a wireless network in a slotted mode of operation and in a non-slotted mode of operation, a method of controlling the slotted mode of operation and the non-slotted mode of operation comprising the steps of:
   determining if an external power supply is providing external power to the wireless communication device;

generating a first signal indicating whether external power is being provided; and terminating the slotted mode of operation whenever the first signal indicates that external power is being provided to the wireless communication device.

18. The method as set forth in claim 17 wherein the step of terminating comprises the step of communicating with the base station to establish a non-slotted mode of operation.

19. The method as set forth in claim 17 including the further step of reestablishing the slotted mode of operation whenever the first signal indicates that external power is not being provided.

20. The method as set forth in claim 17 including the further step of measuring a power level provided by the external power supply.

21. The method as set forth in claim 20 including the further steps of:

determining if the measured power level is below a minimum threshold power level; and in response to a determination that the measured power level is below the minimum threshold power level, modifying the first signal to indicate that the external power is not being provided.

* * * * *